(No Model.)  H. E. PRIDMORE.  7 Sheets—Sheet 1.
GRAIN BINDER.

No. 467,197.  Patented Jan. 19, 1892.

Witnesses
Wm. A. Skinkle
Geo. W. Young.

Inventor
Henry E. Pridmore
By his Attorneys
Parkinson & Parkinson (No Model.)  7 Sheets—Sheet 2.

H. E. PRIDMORE.
GRAIN BINDER.

No. 467,197.  Patented Jan. 19, 1892.

Witnesses
Wm A. Skinkle
Geo. W. Young

Inventor
Henry E. Pridmore
By his Attorneys
Parkinson & Parkinson

THE NORRIS PETERS CO., PHOTO-LITHO., WASHINGTON, D. C.

(No Model.) 7 Sheets—Sheet 3.

H. E. PRIDMORE.
GRAIN BINDER.

No. 467,197. Patented Jan. 19, 1892.

Witnesses
Wm A. Skinkle
Geo. W. Young.

Inventor
Henry E. Pridmore.
By his Attorneys
Parkinson & Parkinson (No Model.) 7 Sheets—Sheet 4.
H. E. PRIDMORE.
GRAIN BINDER.

No. 467,197. Patented Jan. 19, 1892.

Witnesses
Wm A. Skinkle
Geo. W. Young

Inventor
Henry E. Pridmore.
By his Attorneys
Parkinson & Parkinson (No Model.) 7 Sheets—Sheet 5.
H. E. PRIDMORE.
GRAIN BINDER.

No. 467,197. Patented Jan. 19, 1892.

Witnesses
Wm A. Skinkle
Geo. W. Young.

Inventor
Henry E. Pridmore.
By his Attorneys
Rasmussen & Rasmussen (No Model.)  7 Sheets—Sheet 6.

H. E. PRIDMORE.
GRAIN BINDER.

No. 467,197. Patented Jan. 19, 1892.

Fig. 17

Witnesses
Wm A. Skinkle
Geo. W. Young.

Inventor
Henry E. Pridmore.
By his Attorneys

United States Patent Office.

HENRY E. PRIDMORE, OF CHICAGO, ILLINOIS, ASSIGNOR TO THE McCORMICK HARVESTING MACHINE COMPANY.

GRAIN-BINDER.

SPECIFICATION forming part of Letters Patent No. 467,197, dated January 19, 1892.

Application filed July 10, 1886. Serial No. 207,672. (No model.)

*To all whom it may concern:*

Be it known that I, HENRY E. PRIDMORE, a citizen of the United States, residing at Chicago, in the county of Cook and State of Illinois, have invented certain new and useful Improvements in Grain-Binders, of which the following is a specification.

The object of this invention is, in part, to form a tight knot uniting the ends of the band close to the gavel, and in part to improve and simplify the general organization of the band placing and uniting mechanism and the actuating-gear of the knotter and holder. For the attainment of these ends the knotter or tying-bill, with the cord laid in proper position across its chin, is caused to move toward the gavel before it commences its revolution, so that it shall in such revolution lay the strands to form the knot close against the straw. Then for the purpose of stripping and tightening said knot it moves away from the gavel. Instead of the knotting-jaws closing with a sudden snap as soon as the end strands have passed between them, as in tying-bills heretofore in use, said jaws are so controlled as to close gradually, allowing the slack yielded by the folds which form the knot, and the loop of which is stretched over the jaws in their open position, to be taken up by the holder instead of being released into the band portion. In the to and fro movements of the knotter it is accompanied by the holder. The holder and knotter spindles are mounted in a swinging stock pivoted to a bracket bolted at its foot to the breast-plate, and at its head having a sleeve in which turns the driving-shaft for said mechanisms. A pinion and delay-shoe on the knotter-spindle engage with a segment-rack and delay-ledge on the face of an adjacent wheel keyed to this shaft, and a spur-pinion at the upper end of said spindle meshes with and drives a gear-wheel at the top of the holder-spindle, thereby turning the holder-disk. A knife pivoted in bearings in said stock is also actuated by a peripheral groove in said cam-wheel to sever the cord at the proper moment, and other incidental improvements are made in the construction, as will appear from the ensuing description.

In the drawings, Fig. 17, a top plan view of a binding attachment to which my invention is applied, the breast-plate and knotting and holding head being removed, but the tyer-cam shown.

Figure 1:
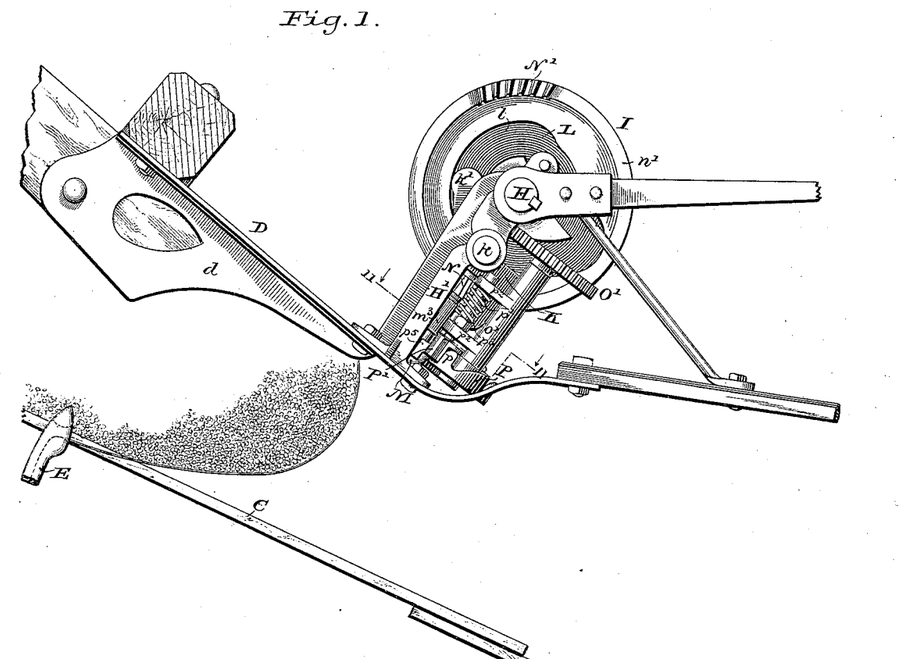
Figure 1 is an elevation from the rear of a portion of a binding attachment, including cord holding and tying devices, actuating-wheel, and packing-chamber, embodying my invention.
Figure 2:
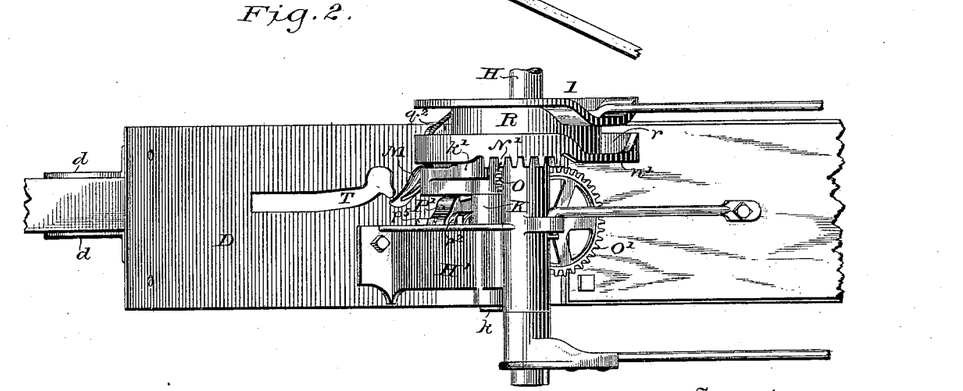
Fig. 2 is a top plan view of the mechanism shown in the foregoing figure.
Figure 3:
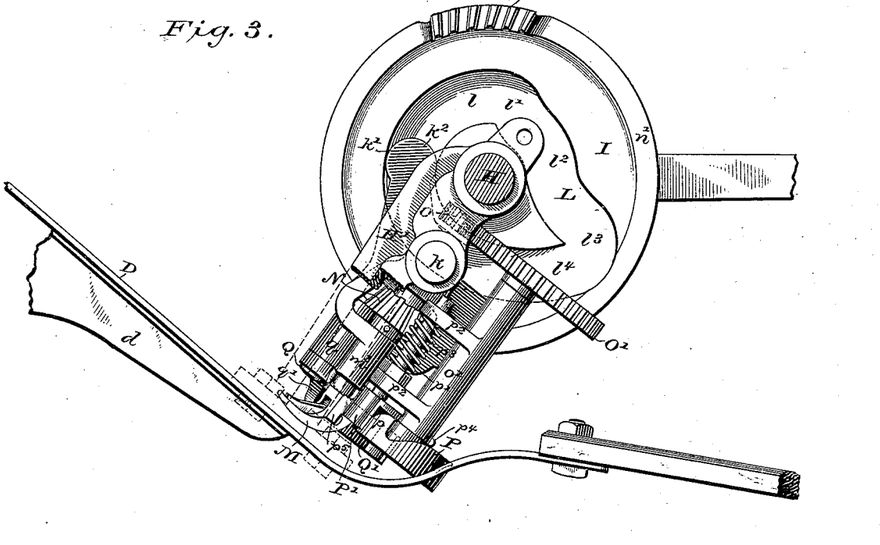
Figs. 3 and 4, enlarged views, respectively, from rear and front of the tying and holding head and tyer-cam in their relation to the breast-plate.
Figure 4:
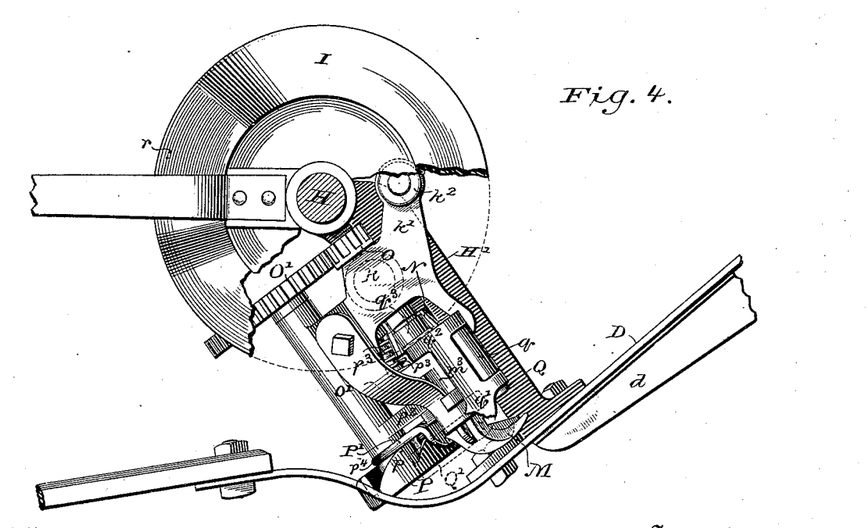
Figure 5:
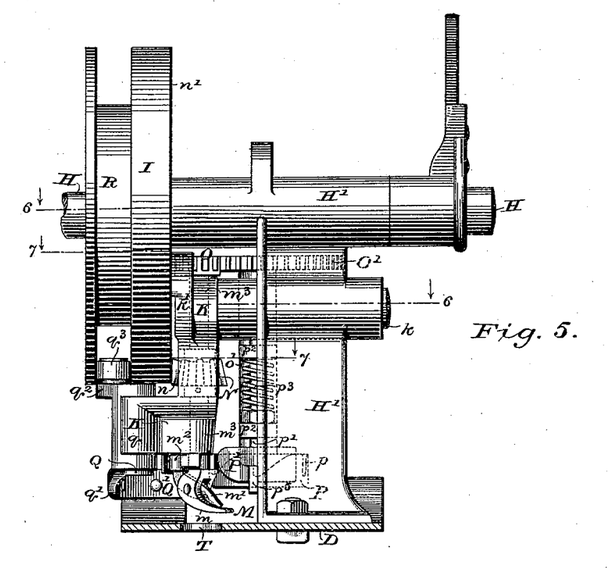
Fig. 5, an elevation of said parts upon the same enlarged scale from the inner or grain side.
Figure 6:
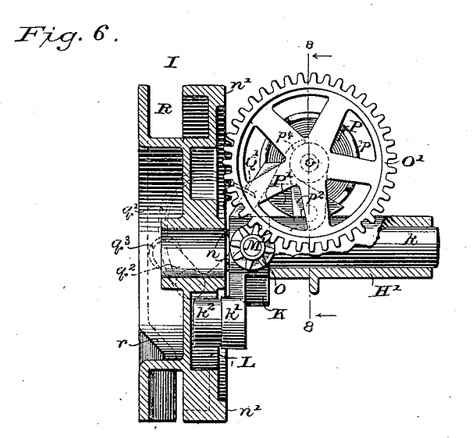
Figs. 6 and 7, sections therethrough upon the correspondingly-numbered lines in the previous figure and looking in the direction therein indicated by arrows.
Figure 7:
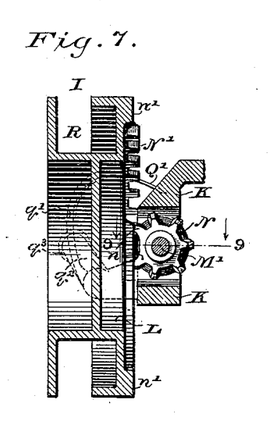
Figure 8:
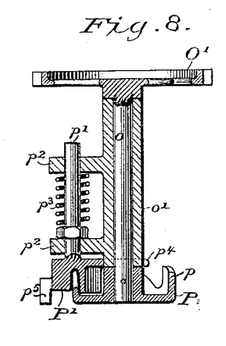
Fig. 8, a section through the holder and the bearings for its spindle and shoe upon the line 8 8, in the sixth figure.
Figures 9, 10:
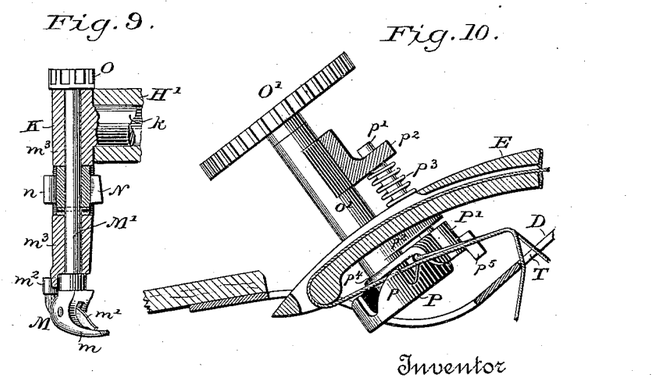
Fig. 9, a section through the bearings for the knotter-spindle, showing also said knotter and spindle, upon the line 9 9 in Fig. 7.
Fig. 10, a detail illustrating the manner in which the binder-arm lays the cord in the holder.
Figure 11:
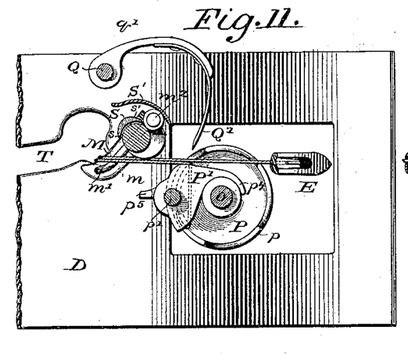
Figs. 11, 12, 13, and 14 are plan views, sectioned on the line 11 11 in Fig. 1 and seen in the direction of the arrows, of the knotter, holder, and cutter in successive stages of action from the start to the completion of the knot.
Figure 12:
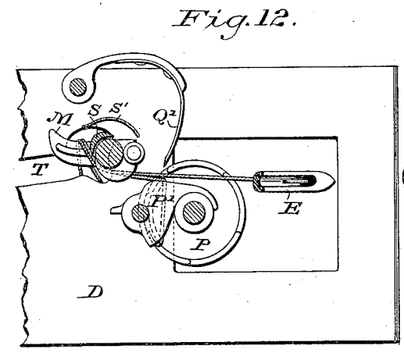
Figure 13:
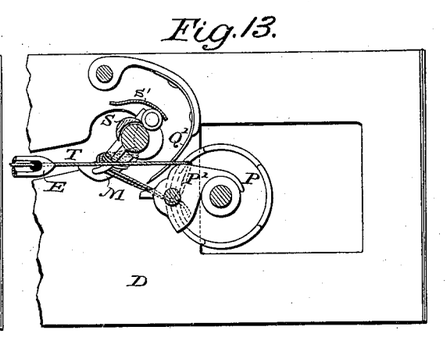
Figure 14:
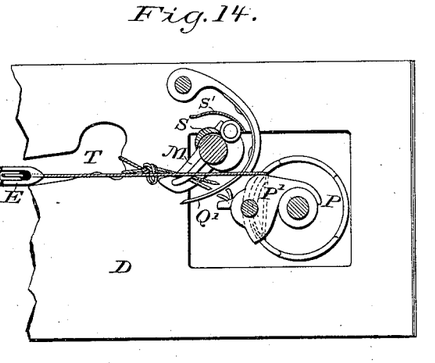
Figure 15:
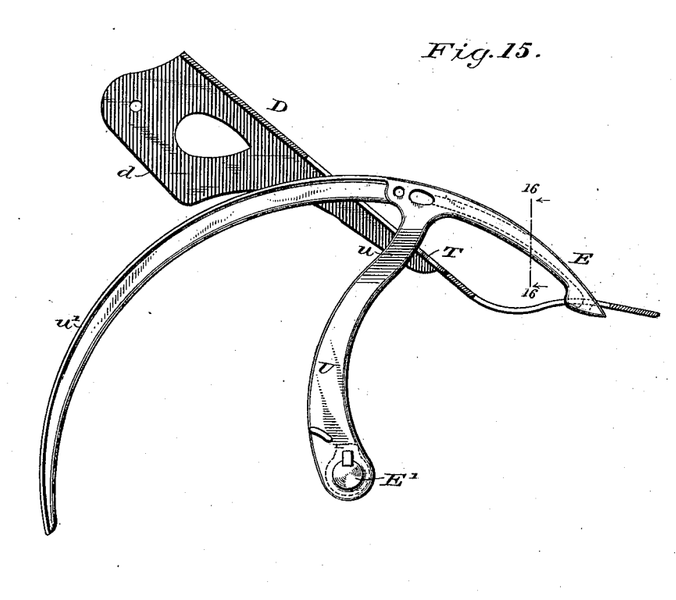
Figs. 15 and 16 are details, respectively, in rear and side elevation of the binder-arm and breast-plate to explain the purpose and operation of the jog in the shank of said arm.
Figure 16:
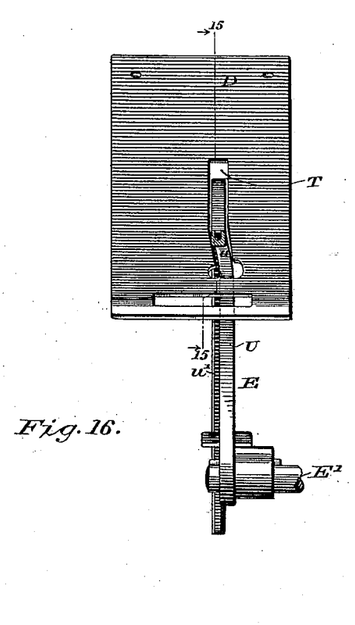
Figure 18:
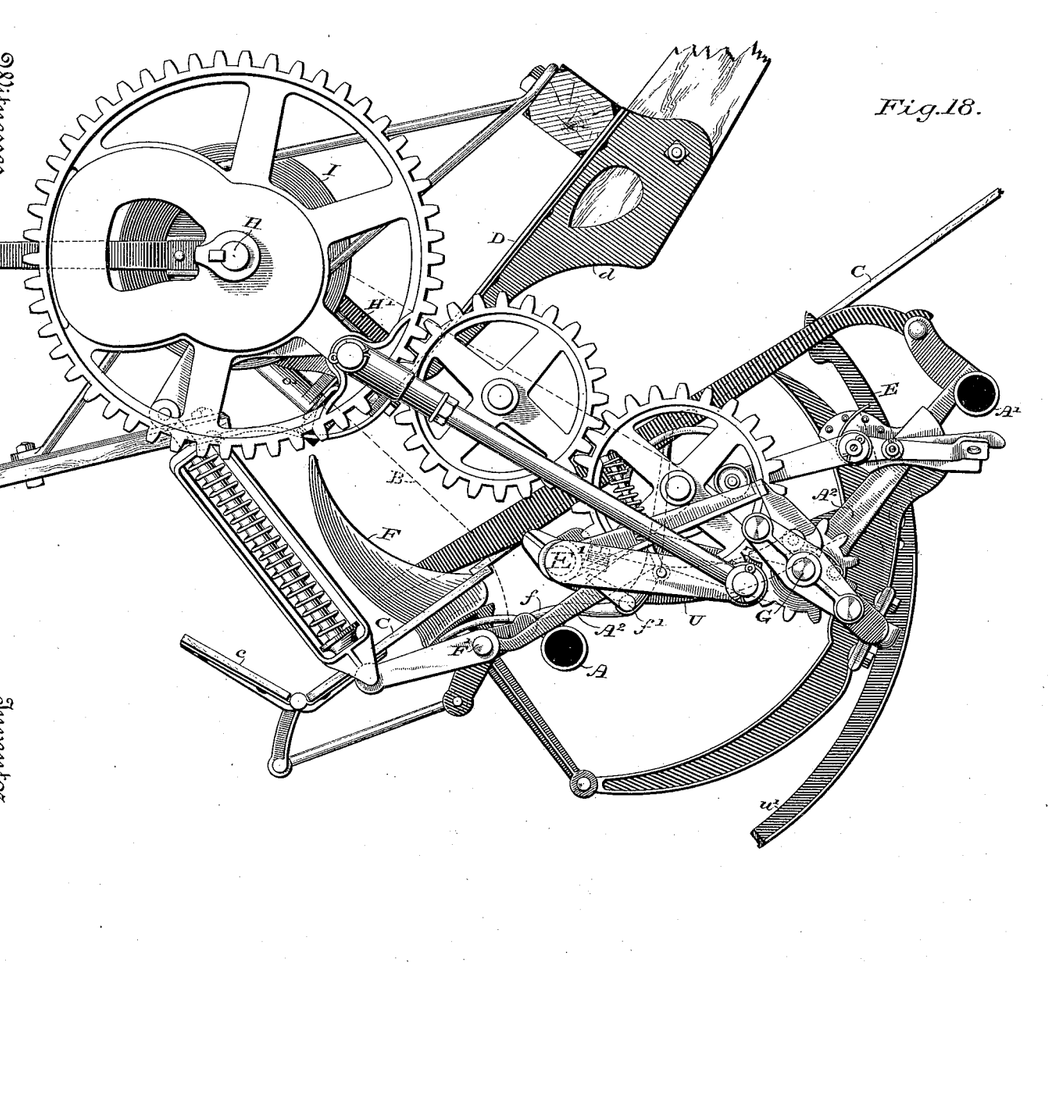
Fig. 18 is a front elevation, partly in section, of said attachment, showing the proper relations of all the parts when in position for action.

The binder-frame, for the purpose of the present description, is the same as that generally employed by the McCormick Harvesting Machine Company and well known in this country, being composed of tubular supporting-bars A A' and transverse tie-bars A² A³, in which certain of the shafts subtending the decking are journaled, and a post-frame B, with overhanging arms b, which receives the shaft for driving the knotter and holder, and subtending-arm b', supporting the binder-arm shaft.

C is the decking of the grain-chute or binding-receptacle. Above the decking is a guard, deflector, or breast-plate D, converging slightly theretoward to form a throatway for the compression of the gavel and to shield the overlying knotting, holding, and cord-severing devices, and ribs or ledges $d$, attached to the under side of this breast-plate, run parallel with the slot therein for the play of the binder-arm to depress the waist of the gavel. The binder-arm E is keyed fast to a rock-shaft E', turning in the subtending-arm of the post-frame, and in its movement to place the cord around the gavel rises through a slot cut in the decking to pass between the ledges and carry its point above the breast-plate. Outside compressing and tripping fingers F are mounted upon a rock-shaft F', parallel with the binder-arm shaft, and, through trip-arm $f$ and trip rock-shaft $f'$, actuate the tripping-clutch. The usual gearing is or may be employed to communicate motion from the main or master shaft G of the binder, or that one upon which the tripping-clutch is located, to the other positively-driven parts. The shaft H, which actuates the band securing and severing devices, is journaled in the overhung arm of the post-frame above the breast-plate, and at the end of this arm above the center of the breast-plate enters a sleeve formed in the head of a bracket H', the feet of which are firmly bolted to the outer part of said plate to support it and hold it rigid. Adjacent to the bracket the shaft receives a cam-wheel I, in some respects the same as heretofore employed in such position, but in others differing materially, as will presently appear.

A horizontal bearing is formed in the bracket beneath and in line with the overhead-driven shaft, receiving a journal $k$ from a stock K, arranged between said bracket and the just-mentioned cam-wheel, and an arm $k'$ from the upper end of said stock is projected along the face of the wheel and carries a lug or roller $k^2$, which enters a cam-groove L, formed in said face and having first a concentric reach $l$, described on a considerable radius, in which the roller rests when the binder is out of action, and along which it travels after the mechanism is started until the binder-arm has placed the cord in position to be grasped by the holder, meanwhile retaining the stock at a standstill, then a short inward reach $l'$, that swings the lower end of the stock toward the gavel and along the slot in the breast-plate, next a second concentric reach $l^2$ on a shorter radius to retain the stock in fixed position for an interval corresponding to the full rotation of the knotter, succeeded by a long tangential reach $l^3$, carrying the stock far back or outward away from the end of the slot in the breast-plate and beyond its original or starting position, and finally a slow return-reach $l^4$, which leads the roller back to its initial position in the first concentric reach, and consequently restores the lower end of the stock likewise to its initial position of rest, when the binding mechanism comes to a stop and awaits the accumulation of another gavel.

The knotter employed is the ordinary "tying-bill" M, having a rigid jaw or crown $m$, and a pivoted inner jaw or chin-piece $m'$, which at its heel end carries a small roller $m^2$ to engage with rigid and elastic cams, whereby said pivoted jaw is opened away from the other or closed thereagainst as the knotter revolves. The spindle M' of this knotter is received in a sleeve-bearing $m^3$ longitudinal of the stock, and preferably but not necessarily so arranged that its axis intersects the pivotal axis of said stock. At a proper point along the spindle is secured a pinion N, having a delay-shoe $n$, and upon the face of the cam-wheel or "tyer-cam" is formed a segment-rack N' of sufficient length to give said pinion one entire rotation, and then a delay-ledge $n'$, extending from one end of the segment to the other on an arc concentric with the axis of the actuating-shaft, with which ledge the delay-shoe engages the instant the pinion passes off of the segment to lock the knotter against displacement until it is again rotated. As the swinging movements of the stock take place only while the shoe is resting upon and sliding over the delay-ledge, it is evident that no disturbance of functional relations will ensue, owing to the eccentricity of the stock-pivot; but as it is intended that the swinging stock shall be at the extreme of its inward movement when the knotter is revolved, and the spindle of the latter therefore inclined to a radius from the tyer-cam, the segment-rack will have skew-teeth properly calculated to such inclination.

At the extreme end of the knotter-spindle is secured a small spur-pinion O, which engages with and drives a large gear-wheel O' on the adjacent end of the holder-spindle $o$, carried in a sleeve-bearing $o'$, supported from the stock outside of or behind the bearings for the knotter-spindle, and in such position that the point of the binder-arm may pass between the two spindles.

The holder which it is preferred to use has an inverted crown-disk P, formed by imposing a vertical flange $p$ around the edge of the main disk. This flange is notched in saw-tooth shape with the shoulders in the advancing direction and slightly rounded at the edges and angles to avoid cutting the cord, and the size of the gear-wheel on the holder-spindle relatively to the driving spur-pinion on the knotter-spindle is determined by multiplying the number of teeth in the latter by the number of notches in the disk, so that each revolution of the knotter-spindle may advance the holder-disk one tooth or notch. A shoe P' at the lower end of a short shank or plunger $p'$, mounted in lugs $p^2$, from the sleeve inclosing the holder-spindle and pressed down by a coiled spring $p^3$, saddles the flange of this crown-disk at a suitable point, so that the cord may be carried underneath by the notches when the disk is rotated and firmly clamped between the shoe and flange. This shoe has a rounded finger $p^4$ extending along and partly embracing the hub of the holder-disk to more certainly deflect the cord as it is brought by the binder-arm into the notch nearest the entrance to said shoe, and, at a little distance behind the point where the initial grasp takes place, has a depending lug $p^5$ outset from the disk, against which the strands of cord, first the old strand left by the binder-arm in its preceding recession and next the new strand just brought in, are carried by the revolution of the disk and stayed during the knotting operation. Another short spindle Q, mounted in a lug $q$ from the foot of the stock, has at its lower end an arm $q'$, carrying a curved knife $Q'$, and at its upper end a second crank-arm $q^2$, bearing a vertical roller $q^3$, which enters a cam-groove R in the periphery of the actuating-wheel and at the proper time is acted upon by a jog or lateral deflection $r$ in this groove to swing the knife toward and past the depending and outsetting lug on the shoe and between said lug and the knotter, in order to shear the strands of cord between the holder and the knotter.

Since the knotter, holder, and cutter have their respective spindles mounted in bearings in the same supporting-stock, it is evident that their relative positions, apart from the changes due to their axial motions, will remain unchanged notwithstanding the swinging of the stock.

Heretofore knotters of the type known as "tying-bill"—that is, where the jaws partake of the outline of a bird's head and bill, and where one is pivoted so as to be moved by extraneous mechanism—have been closed with a sudden snap from the wide-open position the moment that the crossed ends were introduced between them. The loop wound round them was therefore instantly slackened and such slack taken up by the part around the gavel or a portion taken up by said part and another portion by the holder, causing the band to be looser than it should be and looser than it was at the moment that the folds of the knot had been laid, but before the jaws of the knotter closed. This was due to the outline of the fixed cam which acted upon the roller on the heel of the pivoted jaw to open said jaw. This cam inclined outward gradually to open the jaw, then was of such shape as to leave the jaw stationary for a moment, and finally fell sharply away, so that the circumjacent spring-cam pressing on the other side of the roller shut the jaw with vim as the roller left the rigid cam. To obviate this objection, instead of forming the rigid cam S with a gradual incline to open the jaw and then with an abruptly falling away shoulder to permit it to be snapped instantly shut by the action of the spring, it is now formed with a gradual initial incline $s$ to open the jaw, and then with a gradually-retreating incline $s'$, extending nearly the whole length of the circumjacent usual spring-cam $S'$, or that spring-cam which in most modern tying-heads is described about the rigid cam and at a little distance therefrom, and is secured to and supported by any suitable part of the knotter bracket or stock, whereby the jaws shut slowly and the slack from the loop in this closing movement is taken up by the holder as the continuing rotation of the knotter carries the points of the jaws in this closure away from that holder. The knotter-spindle and the holder-spindle being parallel, or nearly parallel, and driven one from the other by directly intermeshing gears, will revolve in opposite directions, thus rotating the holder to the left as the knotter revolves to the right, or vice versa. The binder-arm in laying the cord and delivering it to the holder passes between the two spindles, as already stated, and places the strands in such manner that when the mechanism starts they lie in a notch some distance removed from or in advance of the point where the periphery of the holder-disk comes nearest the knotter. The ensuing motion of the disk imparted by the concurrent revolution of the knotter-spindle is just sufficient to take them to this point, or approximately there, thus giving the necessary slack to the knotter by carrying these end strands gradually nearer thereto as the latter revolves and winds the knot.

In using the crown-disk holder in the described relation to the knotter it is found necessary to make the slot T in the breast-plate slightly oblique instead of laying it entirely in the plane of movement of the binder-arm, so that the strands of cord may be sufficiently deflected to come upon the chin of the knotter. Otherwise these strands would either escape the points of the knotter-jaws, or else the knotter-spindle would have to be so nearly in line with the holder-spindle that the point of the binder-arm would not pass between the two. A change is therefore made in the outline of the stock of the binder-arm U by forming it with a jog or bend $u$ near to the point where it joins the guard $u'$, that serves as a cut-off. This guard, being concentric with the axis of movement of said arm, will always traverse the upper end of the slot, and is therefore described on the same plane as the lower or hub portion of the shank; but the jog or offset near the upper or outer end of said shank will in the movement of the arms come at the lower end of the slot in the breast-plate and will be just sufficient to compensate for the obliquity of said slot.

In operation, supposing at the outset the binder to be in its state of rest, the tying-bill lies at the lower end of the slot in the decking and somewhat outside thereof, with its jaws trending inward lengthwise of said slot, but yet somewhat oblique thereto and pointing thereacross. The strand or cord left by the last recession of the binder-arm is clasped in the holder and belayed over the shoe to bring the portion running to the binder-arm into a vacant notch just in advance of said shoe. Thence it passes over the chin of the knotter and through the slot in the breast-plate down beneath the decking to the point of the binder-arm. Sufficient grain having been collected to form a gavel, the binder starts and the binder-arm rises through the grain-passage, carrying the new or spool strand around the gavel up over the chin of the knotter and laying it in the holder-notch alongside that previously left, knotter and holder meanwhile remaining at rest as the roller-arm from their stock still travels in the initial concentric reach of the cam-wheel. The binder-arm now ceases its movements and the stock swings inward, pushing the knotter along underneath the strand of cord held by the stationary binder-arm until it is practically in contact with the gavel, thus taking up or closing the wedge-like aperture usually left between the two strands from the points where they leave the gavel to the point where they cross the knotter and gathering them in together close to said gavel, when the roller-arm enters the second and lesser concentric reach, holding the stock stationary, the segment on the cam-wheel engages with the knotter-pinion, and both knotter and holder begin to revolve, the latter immediately carrying the twin strands lying in its forward notch beneath the shoe and firmly grasping them, and the former laying the folds of the knot close up against the gavel, and finally receiving the crossed ends between its open jaws at about three-quarters of its full revolution. During the remainder of its revolution the jaws are moving away from the holder and slowly closing, as before explained, so that the slack released from the loop about the jaws is drawn in and taken up by the strain of the holder upon the ends crossed over and running from said loop. At last the knot being fully laid and the ends securely grasped between the jaws of the knotter and tying-bill, the revolution of knotter and holder ceases and the knife immediately enters between them and severs the cord. Then the stock swings back to its extreme limit of movement, carrying the knotter with its jaws trending inward lengthwise of the slot in the breast-plate far past the end of said slot, so that the direct resistance of the gavel of the breast-plate and of the closed end of the slot may tend to strip the loop from the jaws and tighten the knot, which, in the ensuing action of the discharging-arms forcibly ejecting the gavel, is wrenched from the grasp of the knotter. Finally, the stock is returned to its initial or starting position and the binder comes to rest.

I claim—

1. The combination, substantially as hereinbefore set forth, in a grain-binder, of a slotted breast-plate, a tying-bill mounted in a swinging stock, a cord-holder, and actuating mechanism for swinging said stock and tying-bill, whereby the tying-bill is normally held at some distance behind the outer end of the slot with its jaws lying across the line of the general length of said slot until the band has been laid around the gavel and is then advanced to close proximity with the gavel, gathering in the cord in this advancing movement while its jaws still point in their original direction.

2. The combination, substantially as hereinbefore set forth, of a slotted breast-plate, a tying-bill mounted in a swinging stock, and a cam controlling said stock in such manner as to normally retain the knotter at some distance behind the outer end of the slot until the band has been laid, then advance it up the slot to gather in the cord in close proximity with the gavel and hold it temporarily thus advanced, and means for revolving said bill to tie the knot while it is thus held.

3. The combination, substantially as hereinbefore set forth, of a slotted breast-plate, a tying-bill and swinging stock in which the spindle of said tying-bill is mounted, a cam-groove in the face of the tyer-cam having first a concentric reach on a considerable radius, then a short insetting reach, a second concentric reach on a shorter radius, and out-setting reach longer than the insetting, and finally a return-reach to the original or starting point, and an arm from said stock taking into said cam-groove, whereby the tying-bill is caused to receive the band ends at some distance behind the end of the slot, is then moved along said strands to take them up until close to the gavel and held stationary for a time, next moved outward to strip the knot, and finally returned to its original or starting position.

4. The combination, substantially as hereinbefore set forth, of a slotted breast-plate and tying-bill, a holder and swinging stock in which said tying-bill is mounted, a cam whereby said stock is normally held with its lower end and the knotter carried therein at some distance behind the outer end of the slot, then advanced to said outer end, next swung outward beyond its original starting-point, and finally returned to said original point, and a stop-motion gear whereby said knotter is held with its jaws lying across the line of the general length of said slot until the end of the first inward-swinging movement of the stock, then revolved while the stock is stationary, and finally locked in position while the stock is swinging outward and returning to its position of rest.

5. The combination, substantially as hereinbefore set forth, of the swinging stock K, the revolving tying-bill and its spindle and pinion mounted therein, the tyer-cam with its delay-ledge and segment-rack for operating said bill, the cam-groove L in said tyer-cam having the outline shown, and the anti-friction-roller from the swinging stock taking into said cam-groove, whereby the various movements described are timed and positively imparted to the stock and to the tying-bill.

6. The combination, substantially as hereinbefore set forth, with the knotter and its spindle and the holder-disk and its shoe, and its spindle trending parallel with the knotter-spindle, of a gear for driving the knotter-spindle, the spur-pinion on said spindle, and the spur-gear on the holder-spindle directly intermeshing with said pinion, whereby the holder-disk is driven from and concurrently with the knotter-spindle, but in a reverse direction.

7. The combination, substantially as hereinbefore set forth, of the swinging stock, mechanism for operating it, the knotter-spindle mounted in said stock, the parallel holder-spindle also mounted therein, the tyer-cam with its segment-rack and delay-shoe for driving the knotter, the spur-pinion on the knotter-spindle, and the directly-intermeshing spur-gear on the holder-spindle.

8. The combination, substantially as hereinbefore set forth, with the binder-arm, of the tying-bill and the crown-disk holder arranged on practically parallel spindles on opposite sides of the plane of movement of the binder-arm, and mechanism for rotating said spindles in opposite directions.

9. The combination, substantially as hereinbefore set forth, of the tying-bill, the crown-disk holder, the disk of which revolves in a direction opposite to the tying-bill, the obliquely-slotted breast-plate, and the binder-arm having a jog in its shank to permit it to play through said slot, whereby said binder-arm passes between the holder and knotter and the cord is deflected along the slot to come over the chin of the knotter.

10. The combination, substantially as hereinbefore set forth, of the obliquely-slotted breast-plate, the tying-bill and its spindle, the crown-disk holder and holder-spindle, the spur-pinion on the tyer-spindle and directly intermeshing spur-gear at the head of the holder-spindle, and the binder-arm having a jog in its shank, whereby said arm passes through the oblique slot and between the holder and tyer and the strands are deflected properly to come over the chin of the tyer.

11. The combination, substantially as hereinbefore set forth, with the crown-disk, of the holder-shoe having a finger setting in toward the axis of the disk to deflect the cord-strands.

12. The combination, substantially as hereinbefore set forth, with the crown-disk, of the holder-shoe having the extended finger partly embracing the hub of the crown-disk to properly direct the cord-strands.

13. The combination, substantially as hereinbefore set forth, of the binder-arm, the tying-bill, the crown-disk revolving in the opposite direction from said bill and having its axis on the opposite side of the plane of movement of the binder-arm, and the shoe saddling the flange of said disk and having an extended finger embracing the hub of the disk on the side adjacent to said plane of movement.

14. The combination, substantially as hereinbefore set forth, of the tying-bill, its spindle, the crown-disk holder and its spindle, gear which revolves the tying-bill and the holder-disk in opposite directions, a knife secured to an arm on the foot of a spindle that turns on bearings in the common supporting-stock, and the tyer-cam having a segment-rack and delay-ledge on one side to actuate the tying-bill, and a peripheral cam-groove to oscillate the knife-spindle.

15. The combination, substantially as hereinbefore set forth, of the knotter and the holder, the swinging stock in which they are mounted, the knife secured to an arm from a spindle mounted in the said stock, and the tyer-cam having segment-rack, delay-ledge, and face-cam to actuate the knotter and its swinging stock, and peripheral cam-groove to operate the knife.

16. The combination, substantially as hereinbefore set forth, of a tying-bill, the crown-disk holder, the swinging stock in which they are mounted, a knife supported from the said stock, and mechanism actuating said knife at the end of the tying revolution and while the swinging stock is held stationary in its most advanced position to sever the cord-strands.

17. The combination, substantially as hereinbefore set forth, with the tying-bill and with the crown-holder disk, of a shoe saddling the rim of said disk adjacent to the bill, and a lug or finger depending from the outer wall or flap of said shoe to stay the strands of cord.

18. The combination, substantially as hereinbefore set forth, with the tying-bill and with the crown-holder disk revolving in a direction opposite to that of the bill, and with a binder-arm which carries the cord between the two, of a shoe saddling the rim of said disk adjacent to the tying-bill, and a lug or finger depending from the outer flap of said shoe to prevent the strands of cord from being carried beyond the grasp of the tying-jaws.

19. The combination, substantially as hereinbefore set forth, with the tying-bill and with the crown-holder disk, of a shoe saddling the rim of said disk adjacent to the bill, an outsetting lug or finger depending from the outer wall or flap of said shoe to stay the strands of cord, and a knife shearing past said lug transversely of the holder-spindle to sever the strands.

20. The combination, substantially as hereinbefore set forth, with the pivoted jaw of a tying-bill, and a holder which acts to carry the ends of the cord first toward said tying-bill and then away therefrom, of mechanism which causes said pivoted jaw to close gradually and positively prevents a rapid closing at the end of the tying revolution, in order that the slack of the loop may be taken up by the holder as it carries the ends of the cord away from the knotter in its continuing terminal movement.

21. The combination, substantially as hereinbefore set forth, in a tying-bill, with the pivoted jaw and the roller on the heel of said jaw, and with the fixed opposing jaw, the two affording the opposite peripheries of the bill, of a positive cam inclined both at its forward and rear ends, and a circumjacent spring-cam whereby said pivoted jaw is opened by the positive cam and closed gradually by the spring-cam as it rides off the positive cam, that the slack of the loop may be taken up by the holder or drawn into the knot.

22. The combination, substantially as hereinbefore set forth, with the pivoted jaw, of the tying-bill and the roller on its heel-extension and with the fixed opposing jaw, the two affording the opposite peripheries of the bill, of the cam S, having the inclines $s\ s'$, and the circumjacent spring-cam S', whereby the closing of the pivoted jaw is made gradual.

HENRY E. PRIDMORE.

Witnesses:
LEONARD VASSALL,
PAUL ARNOLD.